Patented Sept. 10, 1946

2,407,301

UNITED STATES PATENT OFFICE 2,407,301

CONDENSATION OF KETENES WITH DIKETONES

John A. Spence and Edward F. Degering, West Lafayette, Ind., assignors to Purdue Research Foundation, La Fayette, Ind., a corporation of Indiana No Drawing. Application October 2, 1944,
Serial No. 556,886

14 Claims. (Cl. 260—488)

This invention relates to the condensation of a ketene with a diketone.

Ketene is known to react with certain organic and inorganic compounds, and is known to react with itself. However, it has been generally believed that ketene would not react with a ketone, and since the common method for preparing ketene is by the pyrolysis of a ketone, viz. acetone, and since no reaction occurs between the acetone and the ketene, this belief was apparently justified.

Recently it has been found, however, the ketene could be condensed, in the presence of certain acid catalysts, with ketones. See the copending application of Bernard H. Gwynn and Edward F. Degering, Serial No. 459,448, filed September 23, 1942.

We have now found that ketenes can be condensed with diketones to produce unsaturated carboxylic esters. It is accordingly an object of our invention to provide a process for preparing unsaturated carboxylic esters. A further object is to provide new unsaturated carboxylic esters. Other objects will become apparent hereinafter.

In accordance with our invention, we prepare unsaturated carboxylic esters by condensing a ketene with a diketone, in the presence of an acid catalyst. Typical of the diketones which we employ in practicing our invention are the 1,2-diketones, the 1,3-diketones, the 1,4-diketones, the 1,5-diketones, etc. The diketone should be one in which there are at least two hydrogen atoms on a carbon atom or atoms adjacent to one of the keto (carbonyl) groups. Preferably the diketone employed is one in which there are at least three hydrogen atoms on a carbon atom or atoms adjacent to one of the keto groups, i. e. the three hydrogen atoms can be all on one carbon atom adjacent to one of the keto groups, or two of the hydrogen atoms can be on one carbon atom adjacent to one of the keto groups and the other hydrogen atom can be on another carbon atom adjacent to the same keto group.

Among the 1,2-diketones which we employ in practicing our invention are: biacetyl (2,3-butanedione), acetylpropionyl, acetylisobutyryl, bipropionyl, bi-n-butyryl and acetylcaproyl. Among the 1,3-diketones which we employ in practicing our invention are: acetylacetone (2,4-pentanedione), 2,4-hexanedione, 2,4-heptanedione, 5-methyl-2,4-hexanedione, acetylacetophenone (i. e. benzoylacetone), propionylacetophenone, n- and isobutyrylacetophenone, acetylmethylbenzyl ketone (i. e. 1-phenyl-2,4-pentanedione) and 3-methyl-2,4-pentanedione. Among the 1,4-diketones which can be used in practicing our invention are: 2,5-hexanedione, 6-methyl-2,5-heptanedione, 3,6-octanedione and 4-benzoyl-2-butanone. 1,5-diketones e. g. 2,6-heptanedione, and higher molecular weight diketones and cyclic diketones, e. g. 1,3-cyclohexanedione can be employed also.

Generally speaking the best results are obtained with diketones having the following general formula:

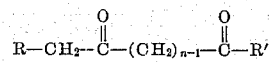

wherein R represents a hydrogen atom, an alkyl group, an aralkyl group or an aryl group, R' represents an alkyl group, an aralkyl group or an aryl group and $n$ represents 1, 2 or 4 or more. With diketones of the above formula where $n$ has the value 3, cyclization is likely to take place with the formation of cyclic products. The compounds wherein R in the above general formula represents hydrogen are especially useful in practicing our invention.

Generally speaking two different unsaturated esters are formed when 1,3-diketones and 1,5-diketones are employed, or when an unsymmetrical 1,2-diketone is employed. Thus, with an unsymmetrical 1,2-diketone of the following general formula:

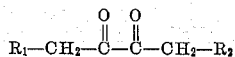

wherein $R_1$ and $R_2$ are different hydrocarbon radicals, the following different unsaturated esters are formed with ketene:

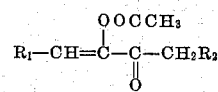

and

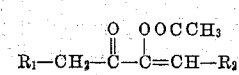

with 1,3-diketones of the following general formula

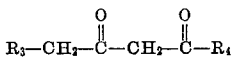

wherein $R_3$ and $R_4$ represent the same hydrocarbon radicals, the following different unsaturated esters are formed with ketene:

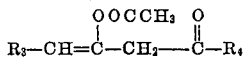

and

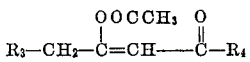

Where $R_3$ and $R_4$ are different radicals two additional unsaturated esters can be formed. Frequently in these cases where two unsaturated esters are formed, one form will predominate nearly to the exclusion of the other, while in other cases, both forms will be found in substantial proportions.

All of the unsaturated esters obtainable by our new process and which correspond to the following general formula are novel:

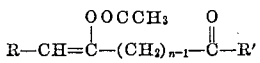

wherein R represents a hydrogen atom, an alkyl group, an aralkyl group or an aryl group, R′ represents an alkyl group, an aralkyl group or an aryl group and $n$ represents 1, 2 or 4 or more. With a ketene of higher molecular weight, unsaturated esters of higher molecular weight (i. e. where the acetate group in the above formula is replaced by a higher molecular weight carboxylate group) are obtained.

On the other hand Nef reports having prepared the following unsaturated ester:

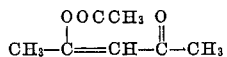

by the action of acetyl chloride on the sodium salt of the enol form of acetylacetone. See Ann. 277, 71 (1893).

Any ketene selected from those represented by the following general formula can be employed in practicing our invention:

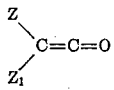

wherein Z and Z′ represent a hydrogen atom, an alkyl group, an aralkyl group or an aryl group. The simplest ketene of the formula $CH_2=C=O$ is especially efficacious, we have found.

With many of the diketones, di-unsaturated esters may be formed in accordance with our invention. Thus with diketones of the following general formula:

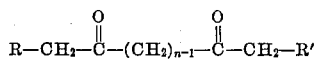

wherein R and R′ represent a hydrogen atom, an alkyl group, an aralkyl group or an aryl group and $n$ represents a positive integer, di-unsaturated esters of the following general formula may be formed with ketene:

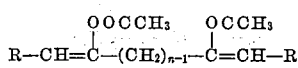

wherein R, R′ and $n$ have the values recited immediately above. Where $n$ has the value 3, the resulting diester may undergo cyclization. Where $n$ has the value 4 or more the diesters are less likely to undergo cyclization. Still other diesters can be formed involving the hydrogen atoms on either side of the same keto group.

In practicing our invention, we employ an acid catalyst. Advantageously this acid catalyst is one containing the —$SO_2OH$ group, e. g. sulfuric acid, a halogenosulfonic acid (for instance chlorosulfonic acid) an alkylsulfuric acid (for instance, methylsulfuric acid) or a sulfamic acid (for instance $H_2N$—$SO_2$—OH or

Most advantageously the acid catalyst is one or more of those represented by the following general formula:

wherein X represents a hydroxyl group, an organic group containing a non-metal in addition to carbon and hydrogen, the X group being linked to the S atom through the said non-metallic atom, or an inorganic group consisting of non-metallic atoms other than carbon. Sulfuric acid is an especially effective catalyst, as are chlorosulfonic acid and sulfamic acid.

In preparing the unsaturated esters of our invention, the diketone is placed in a reaction vessel along with a small quantity of the acid catalyst, e. g. sulfuric acid. The mixture is then raised to reaction temperature and a ketene, preferably freshly prepared, is added to the mixture at a rate which substantially precludes the building up in the reaction mixture of any substantial quantity of unreacted ketene. The dispersion of the ketene in the reaction mixture is advantageously facilitated by agitation of the reaction mixture. Agitation also aids in avoiding local over-heating of the reaction mixture. The addition of ketene is advantageously continued until a quantity has been added which is at least as much as the molecular equivalent of the quantity of the diketone present, or until no further reaction takes place.

The ketene employed in practicing our invention can be prepared in any suitable manner. A convenient method for preparing the simplest ketene ($CH_2=C=O$) is by pyrolysis of acetone, removing the small quantity of residual acetone by passing the resulting vapors through a series of cold traps before utilizing the ketene for the condensation reaction of our invention.

The process of our invention takes place over a wide temperature range. Usually we have found that the reaction takes place at an appreciable rate at from about 60° to about 90° C., although higher or lower temperatures can be employed. Especially with higher molecular weight diketones, higher temperatures must be avoided in order to avoid thermal decomposition of the diketone. The heat of reaction may require cooling of the reaction mixture to control the temperature within the desired range.

If desired a reaction medium which is inert to the ketene and the diketone, e. g. a saturated aliphatic hydrocarbon, or an aromatic hydrocarbon, can be employed. However, a reaction medium is unnecessary in the case of most diketones which are liquid at the reaction temperature employed.

The following examples will serve to illustrate further the manner of practicing our invention.

*Example I*

Fifty parts (.5 mole) of freshly distilled acetylacetone (2,4-pentanedione) were placed in a reaction vessel (which may be cooled by means of an ice bath if desired). To the cold acetylacetone were added five-tenths part (.003 mole) of concentrated sulfuric acid. Ketene ($CH_2=C=O$) was then passed into the reaction mixture for four hours at a rate of about 0.15 to 0.23 mole of ketene per hour. During passage of the ketene the temperature of the reaction mixture was maintained at approximately 70° C., and the mixture was continuously agitated. The reaction mixture was distilled and yielded a 25 part fraction boiling at 88° to 90° C. at 22 mm. of mercury, corresponding to a yield of unsaturated acetate of 35.7% based on the acetylacetone employed.

Analysis: Calculated for the unsaturated acetate: C, 59.10, H, 7.07.

Found: C, 59.20, 58.8; H, 6.85, 7.00. The unsaturated acetate was a mixture of compounds having the following formulas:

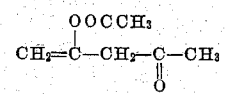

and

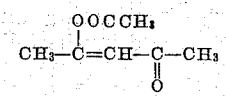

The latter compound was present in much the larger proportion.

*Example II*

Forty-three parts (1 mole) of dried biacetyl (2,3-butanedione) were placed in a reaction vessel with 1 part (.006 mole) of concentrated sulfuric acid. Ketene was then passed through the mixture at a rate of about 0.15 to 0.23 mole per hour for 5 hours while continuously agitating the reaction mixture, and while maintaining the reaction mixture at approximately 70° C. The reaction mixture was distilled and resulted in the recovery of 3.5 parts of unsaturated acetate of biacetyl boiling at 60° C. at 15 mm. of mercury pressure, corresponding to a yield of 2.7%. It had a refractive index of $n_D^{20}$ 1.4302.

Analysis: Calculated for unsaturated acetate C, 56.25; H, 6.25.

Found: C, 56.37; H, 6.06. The unsaturated monoacetate has the following formula:

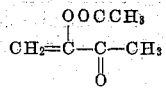

In a similar manner any of the other diketones can be condensed with ketenes. Small amounts of water may be present in any of the reaction mixtures without adversely affecting the process.

The proper quantity of acid employed as catalyst in these condensations will vary with the rate of addition of the ketene, and an increased rate of addition demands a greater amount of catalyst. When operating at the most desirable rate of addition, we have found that the yield of unsaturated ester increases slowly at about the same rate as the concentration of acid is increased. When high concentrations of catalyst are employed, however, the ratio of polymerization of the ketene to the formation of unsaturated ester increases sharply, and the yield of unsaturated ester drops off sharply.

What we claim as our invention and desire to be secured by Letters Patent of the United States is:

1. A process for preparing an unsaturated carboxylic ester comprising condensing, in the presence of an acid catalyst selected from those represented by the following general formula:

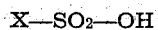

wherein X represents a member selected from the group consisting of a halogen atom, a hydroxyl group, and an organic group containing at least one non-metallic atom selected from the group consisting of nitrogen and oxygen, said organic group being attached to the S atom through said non-metallic atom, a ketene with a diketone in which there is a total of at least two hydrogen atoms on the carbon atoms adjacent to one of the keto groups.

2. A process for preparing an unsaturated carboxylic ester comprising condensing, in the presence of an acid catalyst selected from those represented by the following general formula:

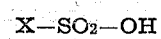

wherein X represents a member selected from the group consisting of a halogen atom, a hydroxyl group, and an organic group containing at least one non-metallic atom selected from the group consisting of nitrogen and oxygen, said organic group being attached to the S atom through said non-metallic atom, a ketene with a diketone in which there is a total of at least three hydrogen atoms on the carbon atoms adjacent to one of the keto groups.

3. A process for preparing an unsaturated carboxylic ester comprising condensing, in the presence of an acid catalyst selected from those represented by the following general formula:

wherein X represents a member selected from the group consisting of a hydroxyl group, an organic group containing at least one non-metallic atom selected from the group consisting of nitrogen and oxygen, and a halogen atom, a ketene with a diketone selected from those represented by the following general formula:

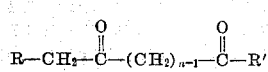

wherein R and R' each represents a member selected from the group consisting of a hydrogen atom, an alkyl group, an aralkyl group and an aryl group, and $n$ represents a positive integer selected from the group consisting of 1, 2 and 4.

4. A process for preparing an unsaturated carboxylic ester comprising condensing, in the presence of sulfuric acid, a ketene with a diketone selected from those represented by the following general formula:

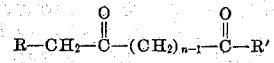

wherein R and R' each represents a member selected from the group consisting of a hydrogen atom, an alkyl group, an aralkyl group and an aryl group, and $n$ represents a positive integer selected from the group consisting of 1, 2 and 4.

5. A process for preparing an unsaturated carboxylic ester comprising condensing, in the presence of sulfamic acid, a ketene with a diketone selected from those represented by the following general formula:

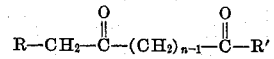

wherein R and R' each represents a member selected from the group consisting of a hydrogen atom, an alkyl group, an aralkyl group and an aryl group, and $n$ represents a positive integer selected from the group consisting of 1, 2 and 4.

6. A process for preparing an unsaturated carboxylic ester comprising condensing, in the presence of chlorosulfonic acid, a ketene with a diketone selected from those represented by the following general formula:

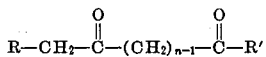

wherein R and R' each represents a member selected from the group consisting of a hydrogen atom, an alkyl group, an aralkyl group and an aryl group, and $n$ represents a positive integer selected from the group consisting of 1, 2 and 4.

7. A process for preparing an unsaturated acetate comprising condensing, in the presence of an acid catalyst selected from those represented by the following general formula:

$$X—SO_2—OH$$

wherein X represents a member selected from the group consisting of a halogen atom, a hydroxyl group, and an organic group containing at least one non-metallic atom selected from the group consisting of a nitrogen atom and an oxygen atom, said organic group being attached to the S atom through said non-metallic atom, ketene with a diketone in which there is a total of at least two hydrogen atoms on the carbon atoms adjacent to one of the keto groups.

8. A process for preparing an unsaturated acetate comprising condensing, in the presence of an acid catalyst selected from those represented by the following general formula:

$$X—SO_2—OH$$

wherein X represents a member selected from the group consisting of a halogen atom, a hydroxyl group, and an organic group containing at least one non-metallic atom selected from the group consisting of a nitrogen atom and an oxygen atom, said organic group being attached to the S atom through said non-metallic atom, ketene with a diketone in which there are at least three hydrogen atoms on a carbon atom or atoms adjacent to one of the keto groups.

9. A process for preparing an unsaturated acetate comprising condensing, in the presence of an acid catalyst selected from those represented by the following general formula:

$$X—SO_2—OH$$

wherein X represents a member selected from the group consisting of a halogen atom, a hydroxyl group, and an organic group containing at least one non-metallic atom selected from the group consisting of a nitrogen atom and an oxygen atom, said organic group being attached to the S atom through said non-metallic atom, ketene with a diketone selected from those represented by the following general formula:

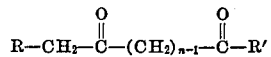

wherein R and R' each represents a member selected from the group consisting of a hydrogen atom, an alkyl group, an aralkyl group and an aryl group, and $n$ represents a positive integer selected from the group consisting of 1, 2 and 4.

10. A process for preparing an unsaturated acetate comprising condensing, in the presence of sulfuric acid, ketene with a diketone selected from those represented by the following general formula:

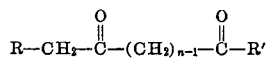

wherein R and R' each represents a member selected from the group consisting of a hydrogen atom, an alkyl group, an aralkyl group and an aryl group, and $n$ represents a positive integer selected from the group consisting of 1, 2 and 4.

11. A process for preparing an unsaturated acetate comprising condensing, in the presence of sulfamic acid, ketene with a diketone selected from those represented by the following general formula:

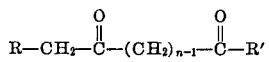

wherein R and R' each represents a member selected from the group consisting of a hydrogen atom, an alkyl group, an aralkyl group and an aryl group, and $n$ represents a positive integer selected from the group consisting of 1, 2 and 4.

12. A process for preparing an unsaturated acetate comprising condensing, in the presence of chlorosulfonic acid, ketene with a diketone selected from those represented by the following general formula:

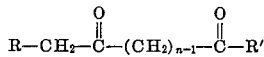

wherein R and R' each represents a member selected from the group consisting of a hydrogen atom, an alkyl group, an aralkyl group and an aryl group, and $n$ represents a positive integer selected from the group consisting of 1, 2 and 4.

13. A process for preparing an unsaturated acetate comprising condensing, in the presence of sulfuric acid, ketene with biacetyl.

14. The unsaturated ester having the following formula:

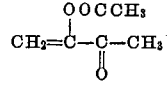

JOHN A. SPENCE.
EDWARD F. DEGERING.